(12) United States Patent
Zhang et al.

(10) Patent No.: US 7,997,117 B2
(45) Date of Patent: Aug. 16, 2011

(54) ELECTRICALLY CONTROLLED HYDRAULIC VALVE CALIBRATION METHOD AND SYSTEM

(75) Inventors: Jiao Zhang, Naperville, IL (US); Benjamin Yoo, Morton, IL (US); Aleksandar M. Egelja, Naperville, IL (US); Tonglin Shang, Bolingbrook, IL (US); Matthew James Beschorner, Plainfield, IL (US)

(73) Assignee: Caterpillar Inc., Peoria, IL (US)

( * ) Notice: Subject to any disclaimer, the term of this patent is extended or adjusted under 35 U.S.C. 154(b) by 737 days.

(21) Appl. No.: 12/149,992

(22) Filed: May 12, 2008

(65) Prior Publication Data

US 2009/0277243 A1 Nov. 12, 2009

(51) Int. Cl.
*G01B 3/00* (2006.01)
(52) U.S. Cl. .......................................................... 73/1.79
(58) Field of Classification Search .................. None
See application file for complete search history.

(56) References Cited

U.S. PATENT DOCUMENTS

| | | | |
|---|---|---|---|
| 4,417,312 A | 11/1983 | Cronin et al. | |
| 4,879,662 A | 11/1989 | Vicari et al. | |
| 4,980,825 A | 12/1990 | Tootell et al. | |
| 5,623,093 A | 4/1997 | Schenkel et al. | |
| 5,762,475 A | 6/1998 | Maddock et al. | |
| 5,813,226 A | 9/1998 | Krone et al. | |
| 6,357,276 B1 | 3/2002 | Koehler et al. | |
| 6,397,655 B1 | 6/2002 | Stephenson | |
| 6,502,458 B1 | 1/2003 | Krüger et al. | |
| 6,721,674 B2 | 4/2004 | Borzsonyi | |
| 6,745,084 B2 | 6/2004 | Boger et al. | |
| 6,889,121 B1 | 5/2005 | Shahroudi et al. | |
| 7,266,467 B1 | 9/2007 | Peake | |
| 7,512,460 B2 * | 3/2009 | Strosser et al. | 700/282 |
| 2001/0037670 A1 | 11/2001 | Boger et al. | |
| 2004/0122612 A1 | 6/2004 | Mann et al. | |
| 2004/0206155 A1 | 10/2004 | Sosnowski | |
| 2006/0009925 A1 | 1/2006 | Larson | |
| 2008/0053191 A1 | 3/2008 | Yoo et al. | |

FOREIGN PATENT DOCUMENTS

| | | |
|---|---|---|
| JP | 10054059 | 2/1998 |
| KR | 1020040057486 | 7/2004 |
| KR | 1020080006667 | 1/2008 |

\* cited by examiner

*Primary Examiner* — Robert R Raevis
(74) *Attorney, Agent, or Firm* — Finnegan, Henderson, Farabow, Garrett & Dunner LLP (57) ABSTRACT

A method of calibrating an electrically controlled hydraulic valve having a known relationship between flow rate through the valve and displacement of a valve element is disclosed. The method includes ascertaining a first current level for actuating the electrically controlled hydraulic valve to move the valve element to a position adjacent an inlet port, and a first displacement of the valve element responsive to the first current level. The method also includes ascertaining a second current level for actuating the electrically controlled hydraulic valve to move the valve element from the position adjacent the inlet port to a position permitting flow through the inlet port, and ascertaining a second displacement of the valve element responsive to the second current level. The method further includes establishing a relationship between current and displacement associated with the electrically controlled hydraulic valve.

20 Claims, 4 Drawing Sheets

FIG. 4

ELECTRICALLY CONTROLLED HYDRAULIC VALVE CALIBRATION METHOD AND SYSTEM

TECHNICAL FIELD

The present disclosure relates generally to valve calibration and, more particularly, to an electrically controlled hydraulic valve calibration method and system.

BACKGROUND

Controlling the operation of a hydraulic component in a hydraulic circuit, such as a piston and cylinder assembly, can be accomplished using an electrically controlled hydraulic valve. An electrically controlled hydraulic valve typically includes an inlet port and an outlet port for fluid flow, a displaceable valve element, which may allow or block fluid flow through the inlet port, and a solenoid having an armature associated with the displaceable valve element. When current is applied to the solenoid, the armature will move under electro-magnetic forces generated by the solenoid. The moving armature can cause the attached valve element to move for a certain displacement responsive to the current level. The displacement of the valve element is generally a linear or non-linear function of the amount of current applied to the solenoid.

Typically, when the current applied to the solenoid is increased from zero to a certain level, the valve element is displaced from an origin position to a position for a certain displacement corresponding to the current level. For example, when current $I_0$ is applied to the valve, the valve element may be displaced for displacement $X_0$ from the origin position to a position where the valve just opens enough to allow fluid flow through the valve inlet port. In a displacement-current relationship map, the associated current level $I_0$ and displacement $X_0$ of the valve element are typically referred to as coordinates of a "cracking point." Therefore the cracking point is associated with a cracking point current $I_0$ and a cracking point displacement $X_0$ of the valve element. Before a valve is used for hydraulic control, the cracking point may need to be determined. Then the cracking point current $I_0$ can be added to subsequent solenoid current commands to compensate for the corresponding offset displacement $X_0$ of the valve element.

Beyond the cracking point in a current-displacement relationship map (i.e., for current greater than $I_0$, and valve element displacement larger than $X_0$), typically, a linear relationship is assumed between the applied current and the valve element displacement, albeit some non-linearity may exist. The linear relationship is typically characterized by a factor K relating current to displacement, such as, $K=(X-X_0)/(I-I_0)$. In other words, the factor K represents a slope of a displacement-current curve. When an operator applies a command current I, the displacement X of the valve element may be calculated if K is known in addition to the known $I_0$ and $X_0$. The relationship between fluid flow rate Q through the valve and displacement X of the valve element is typically known. Therefore, the flow rate Q may be calculated if displacement X is known. Conversely, if a certain flow rate Q is needed to be supplied to a hydraulic component through the valve, from the known relationship between fluid flow rate Q and displacement X, the displacement X corresponding to the needed flow rate Q may be calculated. Then from the linear relationship between X and I characterized by the factor $K=(X-X_0)/(I-I_0)$, the level of current I needed to produce valve element displacement X can be calculated. Therefore, it is important to have a relatively accurate estimate of the factor K in order to accurately characterize the displacement-current relationship of a hydraulic valve, and to accurately control hydraulic components through the valve.

Conventionally, the linear relationship characterized by the factor K may be determined, for example, through a laboratory calibration before installation of the valve for hydraulic control. This determined value of the factor K is treated as a nominal value of the factor K, and is assumed to be constant throughout the service life of the valve. In many cases, only one or a few valves representative of many valves of a same type are calibrated in the laboratory to obtain the nominal value of the factor K, which is then used for all remaining valves of the same type. However, due to various reasons such as variations among the solenoid characteristics of valves, valve spool manufacturing errors, and in-service wear of critical valve components, the actual value of the factor K may vary from one valve to another, and over time. Therefore, the nominal value of the factor K may not accurately reflect the actual current-displacement relationship of a valve. Using the nominal value of the factor K instead of the factor's actual value may cause significant error in the operation of the valve element and in the control of the hydraulic system. For example, when a large amount of current I is applied to the valve, even small difference between the actual value and the nominal value of the factor K may cause large variation in valve displacement X, which in turn may allow an improper amount of fluid to flow through the valve, and subsequently be delivered to other hydraulic components, such as a cylinder. Supplying an improper amount of fluid to the hydraulic components may cause controllability issues, and may adversely impact the components, which may ultimately result in malfunctioning or damage of the components and the hydraulic system.

Therefore, in applications, the use of an assumed constant value for the factor K rather than the actual value may result in large performance variation and may bring about issues such as elevated pump pressure, biased flow distribution, and malfunction of the hydraulic system where valves are employed. Although problematic valves may be disassembled from the machine where they are installed and sent to a laboratory for re-calibration, this process may require a significant amount of machine down time and may be costly in terms of labor. As a result, problematic valves, rather than being re-calibrated, may simply be discarded and replaced by new valves. On-machine valve calibration could reduce machine down time, save costs, and extend the service life of valves.

A method and system to calibrate hydraulic valves of an electrohydraulic system is described in U.S. Pat. No. 5,623,093 (the '093 patent) issued to Schenkel et al. on Apr. 22, 1997. The method and system determine two operating points associated with two positions of a hydraulic cylinder corresponding to magnitude of two electrical signals applied to an electrical valve. Then the two operating points are used to construct a basic valve curve representing the electrohydraulic characteristics of a particular machine, where interpolation may be performed to determine the electrical valve signal magnitude for any operating point between the two operating points.

While the '093 patent may provide for on-machine calibration of an electrohydraulic system, the method and system disclosed in the '093 patent require use of a joystick and position sensors for sensing the positions of the joystick. However, in some hydraulic system, a joystick and position sensors may not be available for calibrating valves. Therefore, the on-machine calibration method and system disclosed in the '093 patent may not be applicable to some hydraulic systems.

The method and system of the present disclosure are directed toward improvements in the existing technology.

SUMMARY

In one aspect, the present disclosure is directed to a method of calibrating an electrically controlled hydraulic valve having a known relationship between flow rate through the valve and displacement of a valve element. The method includes pumping hydraulic fluid from a fluid source through a first electrically controlled hydraulic valve and a second electrically controlled hydraulic valve to be calibrated. The method also includes actuating the second electrically controlled hydraulic valve to be calibrated to move a valve element to a position adjacent an inlet port so that the valve just opens enough to permit flow through the inlet port. The method also includes ascertaining a first current level for actuating the second electrically controlled hydraulic valve to move the valve element to the position adjacent the inlet port, and a first displacement of the valve element responsive to the first current level. The method also includes actuating the second electrically controlled hydraulic valve to move the valve element to a position permitting flow through the inlet port. The method also includes ascertaining a second current level for actuating the second electrically controlled hydraulic valve to move the valve element from the position adjacent the inlet port to the position permitting flow through the inlet port. The method also includes ascertaining a first flow rate through the first electrically controlled hydraulic valve to determine a second flow rate through the second electrically controlled hydraulic valve. The method also includes correlating the determined second flow rate through the second electrically controlled hydraulic valve with a second displacement of the valve element thereof based on the known relationship between flow rate through the valve and displacement of the valve element. The method further includes establishing a relationship between current and displacement associated with the second electrically controlled hydraulic valve based on at least the first and the second current levels and the first and the second displacements.

In another aspect, the present disclosure is directed to a system for calibrating an electrically controlled hydraulic valve having a known relationship between flow rate through the valve and displacement of a valve element. The system includes a first and a second electrically controlled hydraulic valve disposed in parallel with each other, wherein the second electrically controlled hydraulic valve is to be calibrated. A hydraulic fluid pump is configured to pump hydraulic fluid from a fluid source through the first and second electrically controlled hydraulic valves. A controller is configured to actuate the second electrically controlled hydraulic valve to be calibrated to move the valve element to a position adjacent the inlet port so that the valve just opens to permit flow through the inlet port. The controller is also configured to actuate the second electrically controlled hydraulic valve to move the valve element to a position permitting flow through the inlet port. The controller is also configured to ascertain a first current level for actuating the second electrically controlled hydraulic valve to move the valve element to the position adjacent the inlet port, and a first displacement of the valve element responsive to the first current level. The controller is also configured to ascertain a second current level for actuating the second electrically controlled hydraulic valve to move the valve element from the position adjacent the inlet port to the position permitting flow through the inlet port. The controller is also configured to ascertain a first flow rate through the first electrically controlled hydraulic valve to determine a second flow rate through the second electrically controlled hydraulic valve. The controller is further configured to correlate the determined second flow rate through the second electrically controlled hydraulic valve with a second displacement of the valve element thereof based on the known relationship between flow rate through the valve and displacement of the valve element. The controller is further configured to establish a relationship between current and displacement associated with the second electrically controlled hydraulic valve based on at least the first and the second current levels, and the first and the second displacements.

DETAILED DESCRIPTION

Figure 1:
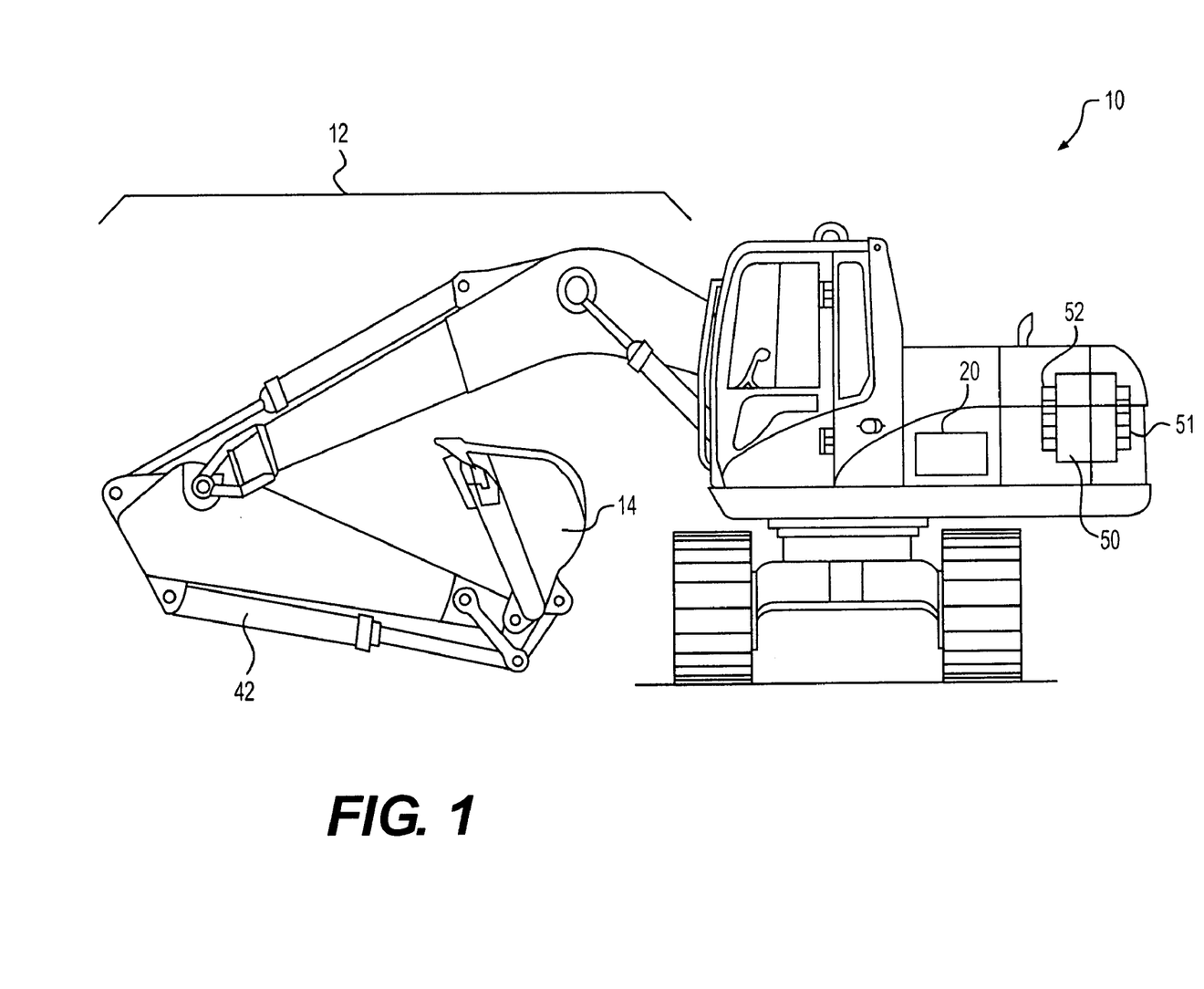
FIG. 1 is a schematic illustration of an exemplary machine including a hydraulic system in which the disclosed method and system can be employed to calibrate hydraulic valves in accordance with the disclosed embodiments.

FIG. 1 schematically illustrates an exemplary machine 10 in which the disclosed method and system may be employed. The machine 10 may be any machine, for example, a wheel loader, an excavator, an on or off-highway vehicle, etc., which may include a hydraulic system 20 to provide forces to operate an implement system 12 for various tasks. The machine 10 may include an engine 50, which may be associated with an air intake system 51 and an exhaust system 52. The implement system 12 may include at least one cylinder 42 and an implement 14, for example, a bucket. The hydraulic system 20 may include various components such as a fluid source, a pump, and various hydraulic valves for controlling fluid flow to the cylinder 42 in the implement system 12.

Figure 2:
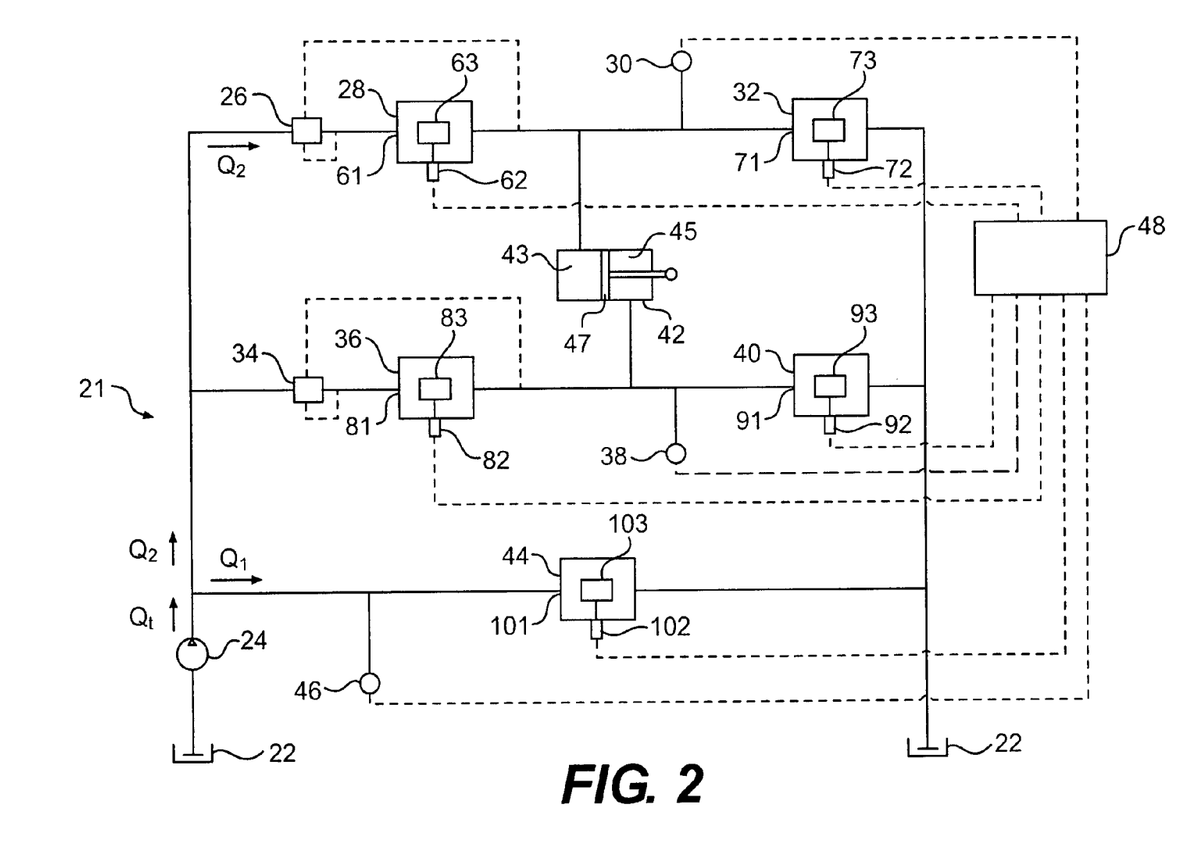
FIG. 2 is a diagrammatic and schematic representation of an exemplary disclosed embodiment of a system for calibrating an electrically controlled hydraulic valve.

FIG. 2 diagrammatically illustrates a system 21 for valve calibration in accordance with disclosed embodiments. The calibration system 21 may be part of the hydraulic system 20. The calibration system 21 may include a fluid source 22, a fluid pump 24, which may be a variable displacement pump, and at least a first (e.g., valve 44) and a second (e.g., valve 28) electrically controlled hydraulic valve. As shown in FIG. 2, in some embodiments, the cylinder 42 may be associated with four independent valves, for example, valves 28, 32, 36, and 40. It is contemplated that the cylinder 42 may also be associated with more or less valves. For example, in some embodiments, the cylinder 42 may be associated with one valve, or two valves that integrate four valve elements 28, 32, 36, and 40. The cylinder 42 may include a first chamber 43 and a second chamber 45 separated by a moving piston 47. The valves 28, 32, 36, and 40 may control fluid flow between the fluid pump 24 and the cylinder 42, and between the cylinder 42 and the fluid source 22. For example, the valve 28 may control fluid flow from the pump 24 to the first chamber 43 of the cylinder 42, the valve 32 may control fluid flow from the first chamber 43 to the fluid source 22, the valve 36 may control fluid flow from the pump 24 to the second chamber 45 of the cylinder 42, and the valve 40 may control fluid flow from the second chamber 45 of the cylinder 42 to the fluid source 22.

The system 21 may also include a valve 44, which may be referred to as a bypass valve in some embodiments, disposed in parallel with the valves 28 and 32, and 36 and 40. The valves 28, 32, 36, and 40 are valves that may require calibration, and the valve 44 may be a valve that is used to assist calibrating the valves 28, 32, 36, and 40. The valves 28, 32, 36, 40, and 44 may all be electrically controlled hydraulic valves. Each valve may include an inlet port, for example, inlet ports 61, 71, 81, 91, and 101 in the valves 28, 32, 36, 40, and 44, respectively. Each valve may include a solenoid, for example, solenoids 62, 72, 82, 92, and 102 in the valves 28, 32, 36, 40, and 44, respectively. Each solenoid may include an armature (not shown) disposed inside the solenoid. The armature may be attached or connected with a displaceable valve element, for example, valve elements 63, 73, 83, 93, and 103 in the valves 28, 32, 36, 40, and 44, respectively. When a current is applied to the solenoid, the armature may move under electromagnetic forces generated by the current in the solenoid, which in turn may displace the attached valve element for a certain displacement responsive to the applied current. The moving valve element (e.g., 63, 73, 83, 93, and 103) may then open or block the inlet port (e.g., 61, 71, 81, 91, and 101) to allow or block fluid flow through the valve (e.g., 28, 32, 36, 40, and 44). For example, the valves 28, 32, 36, and 40 may be initially closed when current applied to the valves is zero. As current is increased, the valve elements 63, 73, 83, and 93 associated with these valves may be displaced proportionally in response to the current to pass their cracking point positions and open the inlet ports 61, 71, 81, and 91, respectively, to allow fluid flow. The valve 44 may operate in an opposite way. The valve element 103 may be initially fully open to allow fluid flow through the inlet port 101 when current applied to the valve is zero. As current is increased, the valve element 103 may be displaced proportionally in response to the current to block the fluid flow through the valve inlet port 101. In some embodiments, the valve 44 may respond to current in a similar fashion as the valves 28, 32, 36, and 40. In other words, the valve 44, similar to the valves 28, 32, 36, and 40, may be initially closed when current applied is zero, and may gradually open the valve as current applied is gradually increased.

The valves 28 and 32 may be disposed in series with each other, forming a first hydraulic circuit branch connected to one side of the cylinder 42, for example, the first chamber 43 of the cylinder 42. Similarly, the valves 36 and 40 may be connected in series with each other, forming a second hydraulic circuit branch connected to the other side of the cylinder 42, for example, the second chamber 45 of the cylinder 42. In some embodiments, the valves 28, 32, 36, and 40 may be referred to as independently controlled metering valves. It is contemplated that each of the valves 28, 32, 36, and 40 may also be any other type of electrically controlled valve that uses an actuator driven by current to move a valve element. The valves 28, 32, 36, and 40 may also be associated with a controller 48. The controller 48 may include an engine control module (not shown) configured to control the engine 50 of machine 10 or may also be a stand-alone controller not associated with the engine control module.

In some embodiments, there may be a pressure compensator valve 26 located adjacent the electrically controlled hydraulic valve 28. Similarly, there may be a pressure compensator valve 34 located adjacent the electrically controlled hydraulic valve 36. The pressure compensator valves 26 and 34 may be configured to control pressure drop across the valves 28 and 36 at a constant level.

The system 21 may also include various pressure sensors configured to measure fluid pressure at various locations. For example, there may be a pressure sensor 30 located adjacent the valve 32 to measure fluid pressure drop across the valve 32, a pressure sensor 38 located adjacent the valve 40 to measure fluid pressure drop across the valve 40, and a pressure sensor 46 located adjacent the valve 44 to measure fluid pressure drop across the valve 44. It is noted that the pressure sensor 46 may also indicate the pressure of the pump 24. The pressure sensors 30, 38, and 46 may be associated with the controller 48. For example, the controller 48 may receive fluid pressure (or pressure drop) signals from the pressure sensors 30, 38, and 46, and may analyze the received signals to control fluid flow through the hydraulic valves 32, 40, and 44 for their operation and calibration.

By utilizing pump 24 and valve 44, each one of the valves 28, 32, 36, and 40 may be calibrated while remaining on the machine 10 so that accurate operation of components, such as the cylinder 42, may be maintained. During calibration, only one valve from the valves 28, 32, 36, and 40 is calibrated at a time. For illustration purposes, hereinafter, valve 28 is assumed to be the valve being calibrated, and is designated as the second electrically controlled hydraulic valve (or the second valve), and the valve 44 is designated as the first electrically controlled hydraulic valve (or the first valve), the valve assisting the calibration of the second valve 28. During calibration of valve 28, the valve 32 may be fully open so that it does not interfere with fluid flow through the valve 28, and the valves 36 and 40 may be fully closed so that no fluid flows through the valves 36 and 40. Since the valve 32 is fully open and does not interfere with the fluid flow through the second valve 28 to be calibrated, the valve 32 can be equally treated as a fluid conduit, and thus may not be mentioned in the discussion of calibrating the second valve 28. The cylinder 42 may be at rest, i.e., in a non-operative state, so that no fluid flows into and out of the chambers 43 and 45 of the cylinder 42. Thus, fluid flow from the pump 24 may only flow through the first valve 44 and the second valve 28 disposed in parallel with each other during calibration.

INDUSTRIAL APPLICABILITY

The disclosed method and system may be applicable to any machine that includes a hydraulic system employing hydraulic valves to control system components. The disclosed method and system may provide for on-machine calibration of an electrically controlled hydraulic valve. The on-machine calibration of an electrically controlled hydraulic valve may provide convenience for maintaining an accurate characterization of the current-displacement and/or a current-flow relationship of the hydraulic valve, which in turn may ensure accurate control of system components. With regular calibration through the disclosed method and system, the service life of the hydraulic valve may be extended. Therefore, both improved system performance and a reduction in costs may result.

Referring to FIG. 1, machine 10 may be any machine that includes a hydraulic system 20 providing hydraulic forces to an implement system 12 for performing various tasks, such as lifting, digging, drilling, etc. The engine 50 may generate power from combusting a mixture of air and fuel. The power generated by the engine 50 may be used, for example, to drive the machine 10. It is also noted that engine speed may be used to calculate a pump flow rate (e.g., engine speed times pump displacement). The cylinder 42 may provide hydraulic forces to the implement 14, such as a bucket, by extending and retracting the piston 47 located inside the cylinder 42.

Referring to FIG. 2, the fluid source 22 may be used to supply and store an amount of hydraulic fluid. The pump 24 may generate a fluid flow by drawing fluid from the fluid source 22 and delivering fluid to various hydraulic components, such as hydraulic valves 28, 32, 36, and 40. The pump 24 may pump fluid to the hydraulic valves at a determined pump pressure, and at a determined pump flow rate. The hydraulic valve 28 may be an electrically controlled metering valve and may control fluid flow from the pump 24 to the cylinder 42. The hydraulic valve 36 may be similar to the hydraulic valve 28 and may function similarly. The valve 32 may also be similar to the hydraulic valve 28 and may control fluid flow from the cylinder 42 to the fluid source 22. The valve 40 may be similar to the valve 32 and may function similarly.

The pressure compensator valve 26 (or 34) may be connected to a first portion upstream of the associated valve 28 (or 36) in the hydraulic circuit where the valve 28 (or 36) is located, and may be connected to a second portion downstream of the associated valve 28 (or 36) in the hydraulic circuit. The pressure compensator valve 26 (or 34) may regulate the pressure drop across the valve 28 (or 36), thereby maintaining the pressure drop across the valve 28 (or 36) at a constant level. The pressure sensors 30, 38, and 46 may be used to measure the fluid pressure drop across the valves 32, 40, and 44. The pressure sensor 46 may also provide pressure measurement of the pump 24. The pressure compensator valves 26 and 34 may not be necessary for valve calibration. Without the pressure compensator valves 26 and 34, the valves 28, 32, 36 and 40 may still be calibrated using the method disclosed herein.

The valves 28, 32, 36, and 40 may be initially closed to block fluid flow when the initial current applied to the valves is zero, and may be gradually opened to allow fluid flow when the current applied is gradually increased. The valve 44 may operate in an opposite way. The valve 44 may be initially fully open to allow fluid flow when the initial current applied is zero, and may be gradually closed when the current applied is gradually increased. During valve calibration, for example, when calibrating valve 28, the valves 36 and 40 may be closed (current applied may be zero). The cylinder 42 may be maintained in a non-operative state, i.e., no fluid flow through the cylinder 42. The valve 32 may be kept fully open so that it does not interfere with fluid flow through the valve 28. Therefore, a fluid flow initiated by the pump 24 may only flow through the valve 44, the valve 28 to be calibrated, and the valve 32 disposed in series with the valve 28. The controller 48 may be used to control the valves 28, 32, 36, 40, and 44. The controller 48 may send current commands to the valves 28, 32, 36, 40, and 44 to drive the valve elements associated with the valves. The controller 48 may also be associated with the pressure sensors 30, 38, and 46 to receive and process pressure signals. The controller 48 may utilize an engine control module configured to control the engine 50. With the controller 48, each valve (28, 32, 36, 40, and 44) may be controlled independently.

Figure 3:
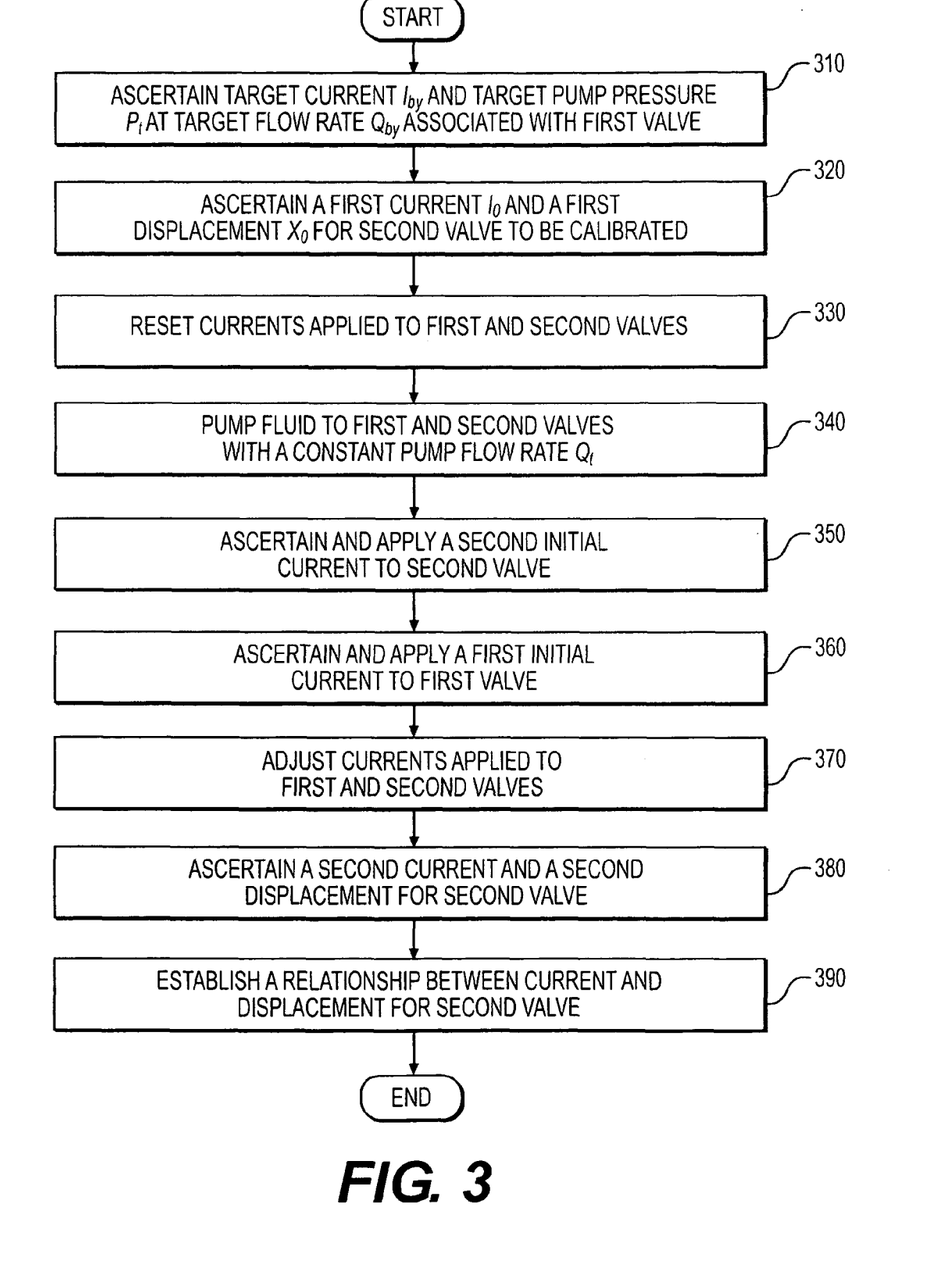
FIG. 3 is a flow chart showing an exemplary disclosed valve calibration process.

An exemplary calibration process in accordance with disclosed embodiments is described in a flow chart in FIG. 3. The entire calibration process may be performed on the machine 10 without disassembling any hydraulic system components from the machine. The calibration process may be conducted at any appropriate time to ensure accurate characterization of the current-displacement relationship (and the current-flow rate relationship) of the second valve 28. The method disclosed herein utilizes the current $I_0$ and the valve displacement $X_0$ associated with the cracking point of the valve. The cracking point parameters $I_0$ and $X_0$ may be obtained in various ways. For example, the cracking point parameters may be already known. Alternatively, if the cracking point parameters are unknown, they may be determined using the disclosed method and system herein, which will be discussed below. The flow chart of FIG. 3 only shows an exemplary calibration process including steps 310-390. The sequence of the steps may not necessarily be the same as that shown in FIG. 3.

The calibration process may start with step 310, where target parameters may be ascertained. These parameters may include a target current $I_{by}$ and a target flow rate $Q_{by}$ associated with the first valve 44, and a target pump pressure $P_t$ of the pump 24. First, all valves 28, 32, 36 and 40 may be closed (e.g., by supplying zero current to the valves), and the cylinder 42 may be placed in a non-operative status such that there is no fluid flow into and out of the chambers 43 and 45. The valve 44 may be set at fully open status (e.g., by supplying zero current to the valve) to allow fluid flow. Therefore, when the pump 24 starts pumping fluid to the hydraulic system, the fluid may only flow through the first valve 44. Then a determined target flow rate $Q_{by}$ may be set for the pump 24, which may be any appropriate value, for example, a minimum flow rate of the pump 24. Then the pump 24 may be operated to pump fluid at the target flow rate $Q_{by}$ to the first valve 44. The current applied to the first valve 44 may be gradually increased to gradually close the first valve 44. As the first valve 44 is gradually closed, the pump pressure may be gradually increased. A range of current may be applied to the first valve 44, for example, from zero to a certain level, and the corresponding range of changing pump pressure may be recorded to obtain a map representing a relationship between current applied to the first valve 44 and the pump pressure when the pump 24 is pumping fluid to the first valve 44 at the target flow rate $Q_{by}$. From the obtained map, the target current $I_{by}$ of the first valve 44 and the target pump pressure $P_t$ may be ascertained, which may be used later in the calibration process of the second valve 28. Although the target current $I_{by}$ of the first valve 44 and the target pump pressure $P_t$ under the target flow rate $Q_{by}$ may be ascertained from the above process, these parameters may also be known in advance before calibrating the second valve 28, for example, from empirical data or a known map. Therefore, the step 310 may not be necessary in some embodiments.

If the cracking point current and cracking point displacement of the valve 28 to be calibrated are not known, these parameters may be obtained using the disclosed system and method, e.g., in step 320. However, it is noted that if those parameters are known in advance before calibrating the second valve 28, the step 320 may not be necessary. To find the cracking point of the second valve 28 using the system 21, the pump 24 may pump fluid at the determined target flow rate $Q_{by}$, and the first valve 44 may be opened by the target current $I_{by}$ so that the pump pressure may be at the target pump pressure $P_t$. Since valves 36 and 40 are also closed, i.e., zero current is applied, a fluid flow from the pump 24 only flows through the second valve 28 and the fully open valve 32 disposed in series with the second valve 28. Current is applied to the second valve 28 to actuate the second electrically controlled hydraulic valve 28 to be calibrated and move the valve element 63 to a specific position (hereinafter referred to as "cracking point position") adjacent the inlet port 61 so that the valve just opens enough to permit flow through the inlet port 61. When the valve element 63 reaches the cracking point position, where the pump pressure starts to drop from the target pump pressure $P_t$, the first current level (i.e., the cracking point current) $I_0$ may be ascertained for actuating the second valve 28 to move the valve element 63 to the cracking point position adjacent the inlet port 61, and the first displacement (i.e., the cracking point displacement) $X_0$ of the valve element 63 responsive to the first current level $I_0$ may also be ascertained as a known value from valve design. The first displacement $X_0$ may also be ascertained through other various means, for example, from an empirical current-displacement map, or from a known relationship (e.g., a mathematical formula) between displacement and current for the range of displacement the valve element 63 travels until reaching the cracking point position adjacent the inlet port 61, etc.

After the first current $I_0$ and the first displacement $X_0$ of the second valve 28 are obtained, currents applied to the first and second valves 44 and 28 may be reset to initialize the valves 44 and 28. For example, currents may be reset to be zero so that the first valve 44 may be fully open to permit fluid flow, and the second valve 28 may be fully closed. In some embodiments, the second valve 28 may be partially open with its current being reset to some predetermined value. The pump 24 then may pump fluid from the fluid source 22 to the first and second valves 44 and 28 with a determined pump flow rate $Q_t$ through the inlet ports 101 and 61 of the first and the second valves 44 and 28 (step 340). The determined pump flow rate $Q_t$ may be the maximum pump flow rate or any appropriate flow rate. Therefore, a first portion of the fluid may flow through the first valve 44, and a second portion of the fluid may flow through the second valve 28 to be calibrated. The second portion of the fluid flowing through the second valve 28 may be ascertained if the first portion of the fluid flowing through first valve 44 is known. In other words, the pump flow rate $Q_t$ equals the summation of a first flow rate $Q_1$ through the first valve 44 and a second flow rate $Q_2$ through the second valve 28 being calibrated. Therefore, if the first flow rate $Q_1$ through the first valve 44 is ascertained, the second flow rate $Q_2$ through the second valve 28 can be ascertained as $Q_2 = Q_t - Q_1$.

A second initial current may be ascertained and applied to actuate the second valve 28 to be calibrated to move the valve element 63 to a position permitting fluid flow through the inlet port 61 of the second valve 28 (step 350). This second initial current is larger than the cracking point current $I_0$, and may be determined, for example, based on at least the determined pump flow rate $Q_t$, the target flow rate $Q_{by}$ through the first valve 44, and a determined quantity $K_{ini}$ relating displacement and current. In some embodiments, the quantity $K_{ini}$ may be selected such that $K_{ini}$ is larger than the actual to-be-determined factor K characterizing the actual displacement-current relationship of the valve 28 being calibrated. Therefore, the initial valve displacement of the valve 28 may be smaller than its desired one. A first initial current may be ascertained and applied to actuate the first valve 44 to move the valve element 103 to a position permitting fluid flow through the inlet port 101 of the first valve 44 (step 360). The first initial current may be selected to be any appropriate current level, for example, a level smaller than the level of the determined target current $I_{by}$.

After the first initial current and the second initial current are applied to the first valve 44 and the second valve 28 respectively, a current adjustment process may be conducted to adjust the initial currents applied to the first and the second valves (step 370). An exemplary adjustment process is illustrated in a flow chart in FIG. 4, which will be discussed in detail below. After the current adjustment process of step 370, the actual current applied to the first valve 44 may have been adjusted to be close to the determined target current $I_{by}$, for example, within a determined tolerance range of $I_{by}$. Therefore, the actual current applied to the first valve 44 may be approximated by the target current $I_{by}$. With the adjusted second initial current applied to the second valve 28, the valve element 63 may have been displaced for a second displacement $X_2$ to a position permitting fluid flow through the inlet port 61 of the second valve 28. The actual pump pressure may have also been adjusted to be close to the determined target pump pressure $P_t$, for example, within a determined tolerance range of $P_t$. Therefore, the actual pump pressure may be approximated by the target pump pressure $P_t$. Then from the previous steps 310-330, the first flow rate $Q_1$ through the first valve 44 may be approximated by the target flow rate $Q_{by}$, i.e., $Q_1 = Q_{by}$.

The second flow rate $Q_2$ through the second valve 28 to be calibrated may be determined by the controller 48 based on at least the determined pump flow rate $Q_t$ and the first flow rate $Q_1$ (which equals to $Q_{by}$), e.g., ($Q_t - Q_1$). The determined second flow rate $Q_2$ may be correlated with a second displacement $X_2$ of the valve element 63 corresponding to the actual current applied to the second valve 28. Then the second displacement $X_2$ may be ascertained based on at least the determined second flow rate $Q_2$ through the second valve 28 and a known relationship between flow rate through the valve and displacement of the valve element (step 380). A second current level $I_2$ applied to the second valve 28 for actuating the second valve to move the valve element 63 to the position permitting flow through the inlet port 61 may also be ascertained. The second current level $I_2$ may be determined to be the actual current applied to the second valve 28 after current adjustment (step 380).

After obtaining the first current $I_0$, the first displacement $X_0$, the second current $I_2$, and the second displacement $X_2$, a relationship between current and displacement associated with the second electrically controlled hydraulic valve may be established based on at least the first and the second current levels and the first and the second displacements (step 390). A relationship between current applied to the second valve 28, and displacement of the valve element 63 of the second valve 28 may be established, for example, through the controller 48 (step 390). First, a difference between the second current level $I_2$ and the first current level $I_0$ may be calculated, for example, by the controller 48, to be $(I_2 - I_0)$. Then a difference between the second displacement $X_2$ and the first displacement $X_0$ may be calculated, for example, by the controller 48, to be $(X_2 - X_0)$. A factor K characterizing the relationship between displacement of the valve element 63 and current applied to the second valve 28 may be calculated, for example, according to $K = (X_2 - X_0)/(I_2 - I_0)$.

After K is calculated, the relationship between any current I larger than $I_0$ applied to the second valve 28 and any corresponding displacement X (larger than $X_0$) of valve element 63 in response to the applied current I may be established by the controller 48. The relationship may provide for accurate control of the valve 28 and the system components controlled by the valve 28, such as the cylinder 42. For example, the relationship may be presented as: $I = (X - X_0)/K + I_0$. It is noted that since the relationship between displacement X of the valve element 63 and flow rate Q through the valve 28 is generally known, the relationship between current I applied to the valve 28 and flow rate Q through the valve 28 may be readily established. Therefore, for example, if a certain flow rate Q through the valve 28 is desired, which may be input to the controller 48 through an input device (not shown) by an operator, through the established relationship, the controller 48 may calculate the current I needed to actuate the valve 28 and move the valve element 63 for a certain displacement to allow such a flow rate Q. Conversely, if a certain current I is applied to actuate the valve 28, through the established relationship, the displacement X of the valve element 63 and the flow rate Q through the valve 28 corresponding to the applied current I may be calculated.

Figure 4:
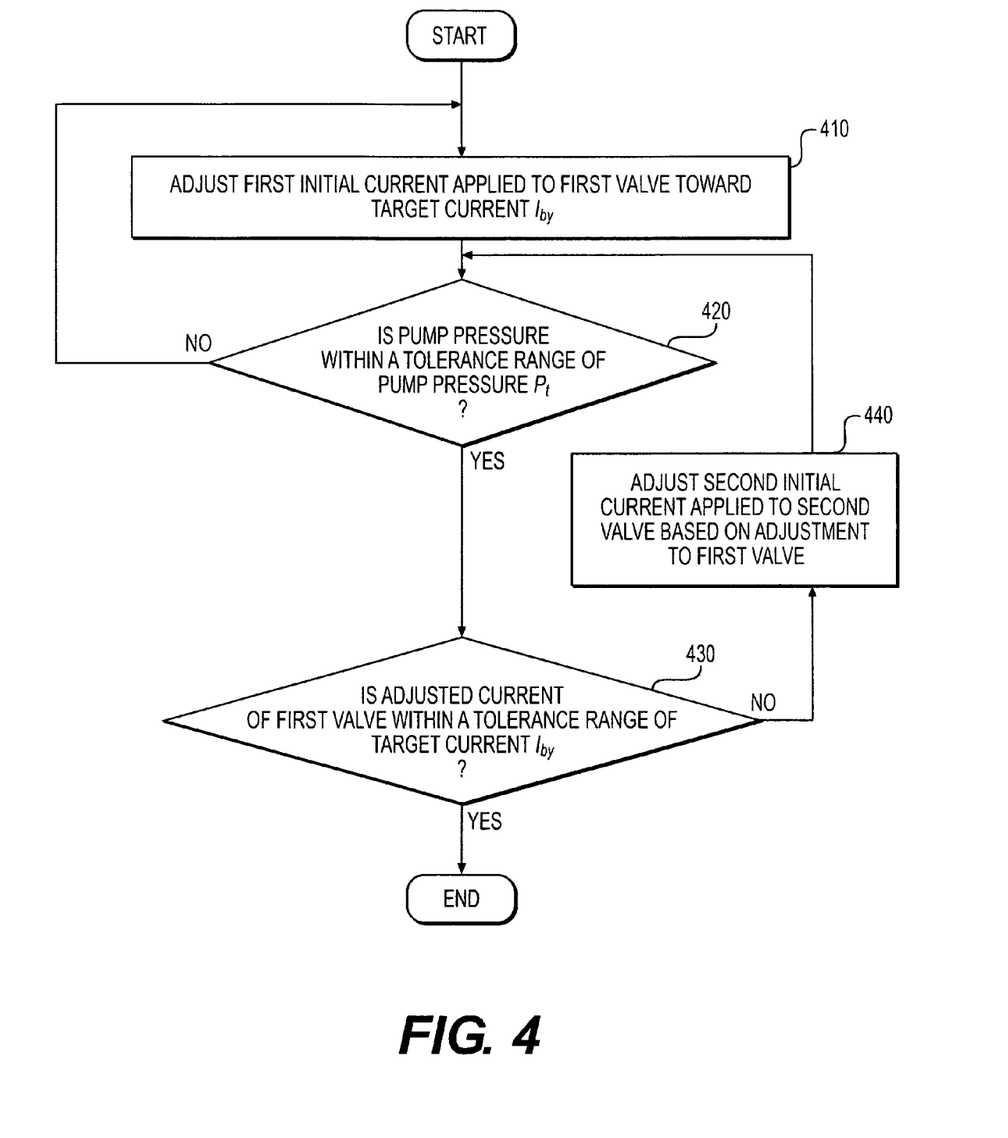
FIG. 4 is a flow chart showing an exemplary disclosed current adjustment process for valve calibration in accordance with disclosed embodiments.

FIG. 4 illustrates an exemplary current adjustment process (corresponding to step 370 of FIG. 3). First, the first initial current applied to the first valve 44 may be adjusted toward the determined target current $I_{by}$ (step 410). The adjustment is preferably gradual so that the current is adjusted gradually in an increasing direction. Meanwhile, the actual pump pressure may be closely monitored. As mentioned earlier, the actual pump pressure may be measured by a pressure sensor installed on the pump, or the pressure sensor 46 located adjacent the pump 24 and the first valve 44. The controller 48 may determine whether the actual pump pressure is within a determined tolerance range of the target pump pressure $P_t$ (step 420). If the actual pump pressure is not within the determined tolerance range (NO, step 420), the adjustment process may continue until the actual pump pressure is within the determined tolerance range (YES, step 420).

If the pump pressure is within a tolerance range of target pump pressure $P_t$, it is then further determined, for example, by the controller 48, whether the amount of current applied to the first valve 44 is within a determined tolerance range of the target current $I_{by}$ (step 430). If the current applied to the first valve 44 after adjustment is not within the determined tolerance range of $I_{by}$ (NO, step 430), the process may continue to adjust the initial current applied to the second valve 28 (step 440). The second initial current applied to the second valve 28 being calibrated may be adjusted according to a known relation with the current adjustment for the first valve 44. For example, the current adjustment needed for the second valve 28 may be proportional to the current adjustment to the first valve 44. After step 440, the process may go back to step 420. If the current applied to the first valve 44 after adjustment is within the determined tolerance range of the target current $I_{by}$ (YES, step 430), the controller 48 may terminate the current adjustment process. Since the actual pump pressure is within the determined tolerance range of the target pump pressure $P_t$, and the current applied to the first valve 44 is within the determined tolerance range of the target current $I_{by}$, from step 310 in FIG. 3, the first flow rate $Q_1$ through the first valve 44 may be approximated by the target flow rate $Q_{by}$, i.e., $Q_1=Q_{by}$.

By utilizing the pump 24 and the first valve 44 disposed in parallel with the valve to be calibrated (e.g., any one of the valves 28, 32, 36, and 40), the disclosed method and system allows for on-machine calibration of an electrically controlled hydraulic valve without disassembling the valve from the machine. The on-machine calibration may be performed at any desired time during the service life of the hydraulic valve, thereby maintaining an accurate characterization of the displacement-current relationship of the hydraulic valve, which in turn may ensure accurate control of the hydraulic system. The accurate characterization of the valve may also prevent adverse effect caused by improper operation with an inaccurate characterization of the valve, and therefore may extend the service life of the hydraulic valves and save maintenance costs associated with the hydraulic valves and the hydraulic system.

It will be apparent to those skilled in the art that various modifications and variations can be made in the disclosed method and system for valve calibration. Other embodiments will be apparent to those skilled in the art from consideration of the specification and practice of the disclosed embodiments herein. It is intended that the specification and examples be considered as exemplary only, with a true scope of the disclosure being indicated by the following claims.

What is claimed is:

1. A method of calibrating an electrically controlled hydraulic valve having a known relationship between flow rate through the valve and displacement of a valve element, comprising:

pumping hydraulic fluid from a fluid source through a first electrically controlled hydraulic valve, and through a second electrically controlled hydraulic valve to be calibrated;

actuating the second electrically controlled hydraulic valve to be calibrated to move the valve element to a position adjacent an inlet port so that the valve just opens enough to permit flow through the inlet port;

ascertaining a first current level for actuating the second electrically controlled hydraulic valve to move the valve element to the position adjacent the inlet port, and a first displacement of the valve element responsive to the first current level;

actuating the second electrically controlled hydraulic valve to move the valve element to a position permitting flow through the inlet port;

ascertaining a second current level for actuating the second electrically controlled hydraulic valve to move the valve element from the position adjacent the inlet port to the position permitting flow through the inlet port;

ascertaining a first flow rate through the first electrically controlled hydraulic valve to determine a second flow rate through the second electrically controlled hydraulic valve;

correlating the determined second flow rate through the second electrically controlled hydraulic valve with a second displacement of the valve element thereof based on the known relationship between flow rate through the valve and displacement of the valve element; and establishing a relationship between current and displacement associated with the second electrically controlled hydraulic valve based on at least the first and the second current levels and the first and the second displacements.

2. The method of claim 1, further including pumping hydraulic fluid from the fluid source at a determined pump flow rate through the first and the second electrically controlled hydraulic valves.

3. The method of claim 1, wherein ascertaining the first flow rate through the first electrically controlled hydraulic valve includes:

setting a determined target flow rate through the first electrically controlled hydraulic valve;

ascertaining a target current associated with the first electrically controlled hydraulic valve and a target pressure of a pump when it is pumping fluid through the first electrically controlled hydraulic valve at the determined target flow rate; and ascertaining the first flow rate through the first electrically controlled hydraulic valve based on at least the target flow rate.

4. The method of claim 2, further including determining the second flow rate through the second electrically controlled hydraulic valve by a controller based on at least the determined pump flow rate and the first flow rate through the first electrically controlled hydraulic valve.

5. The method of claim 3, further including:

ascertaining a first initial current associated with the first electrically controlled hydraulic valve;

ascertaining a second initial current associated with the second electrically controlled hydraulic valve based on at least a determined pump flow rate, the target flow rate through the first electrically controlled hydraulic valve, and a determined quantity relating displacement and current;

applying the first initial current to the first electrically controlled hydraulic valve; and applying the second initial current to the second electrically controlled hydraulic valve.

6. The method of claim 5, further including:

adjusting the first initial current applied to the first electrically controlled hydraulic valve according to a determined adjustment process; and adjusting the second initial current applied to the second electrically controlled hydraulic valve according to the determined adjustment process.

7. The method of claim 6, wherein the determined adjustment process includes adjusting the first initial current applied to the first electrically controlled hydraulic valve until the pressure of the hydraulic fluid pump is within a determined tolerance range of the target pump pressure.

8. The method of claim 7, wherein the determined adjustment process further includes adjusting the second initial current applied to the second electrically controlled hydraulic valve based on at least the adjusted first initial current applied to the first electrically controlled hydraulic valve according to a determined relation.

9. The method of claim 6, further including:

terminating the adjustment process when the adjusted first initial current applied to the first electrically controlled hydraulic valve is within a determined tolerance range of the target current associated with the first electrically controlled hydraulic valve, and pump pressure is within a determined tolerance range of the target pump pressure; and ascertaining, based on at least the adjusted second initial current, the second current level for actuating the second electrically controlled hydraulic valve to move the valve element from the position adjacent the inlet port to the position permitting flow through the inlet port.

10. A system for calibrating an electrically controlled hydraulic valve having a known relationship between flow rate through the valve and displacement of a valve element, comprising:

a first and a second electrically controlled hydraulic valve disposed in parallel with each other, wherein the second electrically controlled hydraulic valve is to be calibrated;

a hydraulic fluid pump configured to pump hydraulic fluid from a fluid source through the first and second electrically controlled hydraulic valves; and a controller configured to:

actuate the second electrically controlled hydraulic valve to be calibrated to move the valve element to a position adjacent the inlet port so that the valve just opens enough to permit flow through the inlet port;

actuate the second electrically controlled hydraulic valve to move the valve element to a position permitting flow through the inlet port;

ascertain a first current level for actuating the second electrically controlled hydraulic valve to move the valve element to the position adjacent the inlet port, and a first displacement of the valve element responsive to the first current level;

ascertain a second current level for actuating the second electrically controlled hydraulic valve to move the valve element from the position adjacent the inlet port to the position permitting flow through the inlet port;

ascertain a first flow rate through the first electrically controlled hydraulic valve to determine a second flow rate through the second electrically controlled hydraulic valve;

correlate the determined second flow rate through the second electrically controlled hydraulic valve with a second displacement of the valve element thereof based on the known relationship between flow rate through the valve and displacement of the valve element; and establish a relationship between current and displacement associated with the second electrically controlled hydraulic valve based on at least the first and the second current levels, and the first and the second displacements.

11. The system of claim 10, wherein the hydraulic fluid pump is further configured to pump hydraulic fluid from the fluid source at a determined pump flow rate through the first and the second electrically controlled hydraulic valves.

12. The system of claim 10, wherein the controller is further configured to ascertain a target current associated with the first electrically controlled hydraulic valve and a target pump pressure when the fluid pump is pumping fluid to the first electrically controlled hydraulic valve at a target flow rate.

13. The system of claim 11, wherein the controller is further configured to determine the second flow rate through the second electrically controlled hydraulic valve based on at least the determined pump flow rate and the first flow rate through the first electrically controlled hydraulic valve.

14. The system of claim 12, wherein the controller is further configured to:

ascertain a first initial current associated with the first electrically controlled hydraulic valve;

ascertain a second initial current associated with the second electrically controlled hydraulic valve based on at least a determined pump flow rate, the first flow rate through the first electrically controlled hydraulic valve, and a determined quantity relating displacement and current;

apply the first initial current to the first electrically controlled hydraulic valve; and apply the second initial current to the second electrically controlled hydraulic valve.

15. The system of claim 14, wherein the controller is further configured to:

adjust the first initial current applied to the first electrically controlled hydraulic valve according to a determined adjustment process; and adjust the second initial current applied to the second electrically controlled hydraulic valve according to the determined adjustment process.

16. The system of claim 15, wherein the controller is further configured to adjust the first initial current applied to the first electrically controlled hydraulic valve until the pressure of the hydraulic fluid pump is within a determined tolerance range of the target pump pressure.

17. The system of claim 16, wherein the controller is further configured to adjust the second initial current applied to the second electrically controlled hydraulic valve based on at least the adjusted first initial current applied to the first electrically controlled hydraulic valve according to a determined relation.

18. The system of claim 17, wherein the controller is further configured to:

terminate the adjustment process when the adjusted first initial current applied to the first electrically controlled hydraulic valve is within a determined tolerance range of the target current associated with the first electrically controlled hydraulic valve, and pump pressure is within a determined tolerance range of the target pump pressure; and ascertain the second current level for actuating the second electrically controlled hydraulic valve to move the valve element from the position adjacent the inlet port to the position permitting flow through the inlet port based on at least the adjusted second initial current.

19. A machine, comprising:
an engine;
a hydraulic system;
an implement system; and
a system for calibrating an electrically controlled hydraulic valve having a known relationship between flow rate through the valve and displacement of a valve element, the system including:
  a first electrically controlled hydraulic valve having a known correlation between current and flow rate;
  a second electrically controlled hydraulic valve to be calibrated and disposed in parallel with the first electrically controlled hydraulic valve;
  a hydraulic fluid pump configured to pump hydraulic fluid from a fluid source through the first and second electrically controlled hydraulic valve; and
  a controller configured to:
    actuate the second electrically controlled hydraulic valve to move the valve element to a position adjacent the inlet port so that the valve just opens enough to permit flow through the inlet port;
    actuate the second electrically controlled hydraulic valve to move the valve element to a position permitting flow through the inlet port;
    ascertain a first current level for actuating the second electrically controlled hydraulic valve to move the valve element to the position adjacent the inlet port;
    ascertain a first displacement of the valve element of the second electrically controlled hydraulic valve in response to the first current level;
    ascertain a second current level for actuating the second electrically controlled hydraulic valve to move the valve element from the position adjacent the inlet port to the position permitting flow through the inlet port;
    ascertain a first flow rate through the first electrically controlled hydraulic valve;
    determine a second flow rate through the second electrically controlled hydraulic valve;
    correlate the determined second flow rate through the second electrically controlled hydraulic valve with a second displacement of the valve element thereof based on the known relationship between flow rate through the valve and displacement of the valve element; and
    establish a relationship between current and displacement associated with the second electrically controlled hydraulic valve based on at least one of the first and the second current levels, and the first and the second displacements.

20. The machine of claim 19, wherein the hydraulic fluid pump is further configured to pump hydraulic fluid from the fluid source to the first and the second electrically controlled hydraulic valves at a determined flow rate.

* * * * *

UNITED STATES PATENT AND TRADEMARK OFFICE
CERTIFICATE OF CORRECTION

PATENT NO.       : 7,997,117 B2                                Page 1 of 1
APPLICATION NO.  : 12/149992
DATED            : August 16, 2011
INVENTOR(S)      : Zhang et al.

It is certified that error appears in the above-identified patent and that said Letters Patent is hereby corrected as shown below:

In the Specification

Column 5, line 22, delete "electromagnetic" and insert -- electro-magnetic --.

Column 8, line 55, delete "$I_{by}$" and insert -- $I_{by}$, --.

Signed and Sealed this
Twenty-first Day of July, 2015

Michelle K. Lee
*Director of the United States Patent and Trademark Office*